US007283717B2

(12) United States Patent
Mendoza et al.

(10) Patent No.: US 7,283,717 B2
(45) Date of Patent: Oct. 16, 2007

(54) INTEGRATED OPTIC DEVICES AND PHOTOSENSITIVE SOL-GEL PROCESS FOR PRODUCING INTEGRATED OPTIC DEVICES

(75) Inventors: Edgar A. Mendoza, Redondo Beach, CA (US); Lothar U. Kempen, Redondo Beach, CA (US); Robert A. Lieberman, Torrance, CA (US)

(73) Assignee: Optinetrics, Inc., Torrance, CA (US)

( * ) Notice: Subject to any disclaimer, the term of this patent is extended or adjusted under 35 U.S.C. 154(b) by 0 days.

(21) Appl. No.: 11/386,515

(22) Filed: Mar. 21, 2006

(65) Prior Publication Data

US 2006/0171650 A1   Aug. 3, 2006

Related U.S. Application Data

(63) Continuation of application No. 09/574,840, filed on May 19, 2000, now Pat. No. 7,016,589.

(51) Int. Cl.
    *G02B 6/10* (2006.01)
(52) U.S. Cl. .................... 385/132; 385/14; 385/37
(58) Field of Classification Search ............... 385/132
    See application file for complete search history.

(56) References Cited

U.S. PATENT DOCUMENTS

| 4,725,110 | A | 2/1988 | Glenn et al. |
| 5,080,503 | A | 1/1992 | Najafi et al. |
| 5,080,962 | A | 1/1992 | Hench |
| 5,151,958 | A | 9/1992 | Honkanen |
| 5,265,185 | A | 11/1993 | Ashley |
| 5,360,834 | A | 11/1994 | Popall et al. |

(Continued)

FOREIGN PATENT DOCUMENTS

| CA | 2218273 | 4/1999 |
| WO | 99/06873 | 2/1999 |

OTHER PUBLICATIONS

Mendoza E.A., Ferrell D.J., Syracuse S.J., Khalil A.N., Lieberman R.A., "Photolithography of Integrated Optice Devices in Sol-Gel Glasses," Proc. SPIE-Int. Soc. Opt. Eng., vol. 2288, pp. 580-588 (1999).

(Continued)

*Primary Examiner*—Frank G. Font
*Assistant Examiner*—Mary El-Shammaa
(74) *Attorney, Agent, or Firm*—Jones Day

(57) ABSTRACT

A photosensitive sol-gel film containing an organometallic photosensitizer is deposited on the oxide containing surface layer of a silicon substrate. A pattern of white or ultra violet light incident to the photosensitive sol-gel film results in the unbinding of the photosensitizer from the exposed regions of the sol-gel film. A subsequent succession of first and second heating steps results in, first, the removal of the photo sensitizer constituents from the exposed regions of the sol-gel film and, second, the removal of the organic constituents from the exposed regions, resulting in regions doped with a metal oxide with non linear optical properties, such as semicondutive, etc. properties. Optical switches, couplers, waveguides, splitters, interferometers wavelength division multiplexer, Bragg gratings and more can be fabricated. A glass substrate also may be employed, instead of a silicon, in which case a separate silicon oxide surface layer is unnecessary.

3 Claims, 10 Drawing Sheets

U.S. PATENT DOCUMENTS

| | | | |
|---|---|---|---|
| 5,574,807 | A | 11/1996 | Snitzer |
| 5,585,640 | A | 12/1996 | Huston et al. |
| 5,620,495 | A | 4/1997 | Aspell et al. |
| 6,054,253 | A | 4/2000 | Fardad et al. |
| 6,103,363 | A | 8/2000 | Boire et al. |
| 6,115,518 | A | 9/2000 | Clapp |
| 6,158,245 | A | 12/2000 | Savant |
| 6,268,089 | B1 | 7/2001 | Chandross et al. |
| 6,665,014 | B1* | 12/2003 | Assadi et al. ............... 348/340 |

OTHER PUBLICATIONS

Najafi, S.I., Touam T., Sara R., Andrews M.P., Fardad M.A., "Sol-Gel Glass Waveguide and Grating on Silicon," Journal of Lightwave Technology, vol. 16, No. 9 (1998).

McEntee J. "Sol-Gel Devices 'will meet cost targets of fibre to the home'," Opto & Laser Europe, Issue 31, p. 5 (1996).

Coudray, P., Chisham, J., Malek-Tabrizi, A., Li, C.-Y., Andrews, M.P., Peyghambarian, N., Najafi, S.I., "Ultraviolet Light Imprinted Sol-Gel Silica Glass Waveguide Devices on Silicon," Optics Comm., 128(1-3) 19-22 (1996).

Coudray, P., Chisham, J., Andrews, M.P., Najafi, S.I., "Ultraviolet Light Imprinted Sol-Gel Silica Glass Low-Loss Waveguides For Use At 1.55 µm," Opt. Eng. 36(4) 1234-1240 (1997).

Fardad, A., Andrews, M., Milova, G., Malek-Tabrizi A., Najafi, I., "Fabrication of Ridge Waveguides:: A New Solgel Route," Applied Optics, vol. 37, No. 12., pp. 2429-2434 (1998).

Najafi, S.I., Armenise, M.N., "Organoaluminophosphate sol-gel silica glass thin films for integrated optics," Proc. SPIE-Int. Soc. Opt. Eng., vol. 2997 pp. 79-84 (1997).

Cindrich I., Lee, S.H., Sutherland, R. L., "Adapting Existing E-Beam Writers to Write HEBS-Glass Gray Scale Masks," Proc. SPIE-Int. Soc. Opt. Eng., vol. 3633 pp. 35-45 (1999).

Kley, E-B., "Continuous Profile Writing by Electron and Optical Lithography," Microelectronic Engineering, 33 pp. 261-298 (1997).

Syms, R.R.A., "Silica-On Silicon Integrated Optics," Advances in Integrated Optics, pp. 121-150 (1994).

Najafi, S.I., Andrews, M.P., Fardad, M.A., Milova, G., Tahar, T., Coudray, P., "UV-Light Imprinted Surface, Ridge and Buried Sol-Gel Glass Waveguides and Devices on Silicon," Proc. SPIE-Int. Soc. Opt. Eng., vol. 2954 pp. 100-104 (1996).

Holmes, A.S., Syms, R.R.A., "Fabrication of Low-Loss Channel Waveguides in Sol-Gel Glass on Silicon Substrates," Advanced Materials in Optics, Electro-Optics and Communication Technologies (1995).

Holmes, A.S., Syms, R.R.A., Li, M., Green M., "Fabrication of Buried Channel Waveguides on Silicon Substrates Using Spin-On Glass," Applied Optics, vol. 32, No. 25 pp. 4916-4921 (1993).

Kawachi, M., "Silica Waveguides on Silicon and Their Application to Integrated-Optic Components," Optical and Quantum Electronics, vol. 22, No. 5, pp. 391-416 (1990).

Ballato, J., Dejneka, M., Riman, R.E., Snitzer, E., Zhou, W., "Sol-Gel Synthesis of Rare-Earth-Doped Fluoride Glass Thin Films," Journal of Materials Research, vol. 11, No. 4., pp. 841-849 (1996).

Yang, L., Saavedra, S.S., Armstrong, N.R., Hayes, J., "Fabrication and Characterization of Low-Loss, Sol-Gel Planar Waveguides," Anal. Chem. vol. 66, No. 8, pp. 1254-1263 (1994).

Schmidt, H., "Thin Films, the Chemical Processing up to Gelation," Structure and Bonding, vol. 77, pp. 119-151 (1992).

Chisham, J.E., Andrews, M.P., Li, C-Y., Najafi, S.I., Makek-Tabrizi, A., "Gratings Fabrication by Ultraviolet Light Imprinting and Embossing in a Sol-Gel Silica Glass," Proc. SPIE-Int. Soc. Opt. Eng., vol. 2695, pp. 52-56 (1996).

Svalgaard, M., Poulsen, C.V., Bjarklev A., Poulsen, O., "Direct UV Writing of Buried Singlemode Channel Waveguides in Ge-Doped Silica Films," Electronic Letters, vol. 30, No. 17, pp. 1404-1403 (1994).

Andrews, M.P., Kanigan T., Najafi, S.I., "Auto-Embossed Bragg Grating From Self-Organizing Polymers: Chemical Tuning of Periodicity and Photoinduced Anisotropy," Proc. SPIE-Int. Soc. Opt. Eng., Vol. 2695, pp. 4-15 (1996).

Najafi, S. I., Li, C-Y., Chisham, J., Andrews, M.P., Coudray, P., Malek-Tabrizi, A., Peyghambarian, N., "Ultraviolet Light Imprinted Sol-Gel Silica Glass Channel Waveguides on Silicon," Proc. SPIE-Int. Soc. Opt. Eng., vol. 2695, pp. 38-41 (1996).

Brinker, C.J., Scherer, G.W., "The Physics and Chemistry of Sol-Gel Processing," Sol-Gel Science, Academic Press, Inc. pp. 864-1879, Not Date.

Li, C.-Y., Chisham, J., Andrews, M., Najafi, S.I., Mackenzie, J.D., Peyghambarian, N., "Sol-Gel Integrated Optical Coupler by Ultraviolet Light Imprinting," Electronic Letters, vol. 31, No. 4, pp. 271-272 (1995).

Andrews, M.P., "An Overview of Sol-Gel Guest-Host Materials Chemistry for Optical Devices," Proc. SPIE-Int. Soc. Opt. Eng., vol. 2997, pp. 48-59 (1997).

Rösch, O.S., Bernhard, W., Müller-Fiedler, R., Dannberg, P., Bräuer, A., R. Buestrich, R., Popall, M., "High Performance Low Cost Fabrication Method for Integrated Polymer Optical Devices," Proc. SPIE-Int. Soc. Opt. Eng., vol. 3799, pp. 214-224, no Date.

Roscher, C., Buestrich R., Dannberg, P., Rösch, O., Popall, M., "New Inorganic-Organic Hybrid Polymers for Integrated Optics," Mat. Res. Soc. Symp. Proc. vol. 519, pp. 239-244 (1998).

Mendoze, E.A., "Photolithography of Integrated Optic Devices in Porous Glasses," UMI Dissertation Services (1992).

Mendoza, A., Wolkow, E., Sunil, D., Wong, P., Sokolow, J., Rafailovich, M., den Boer, M., Gafney, H., "A Comparion of Iron Oxides Photodeposited in Porous Vycor Glass and Tetramethoxysilane/Methanol/Water Xerogels," Langmuir, vol. 7, No. 12, pp. 993-4009 (1991).

Che, T., Soskey, P., Banash, M., Caldwell, M., McCallum, I., Mininni, R., Warden, V., "Optimization of a Gel Derived Gradient Index Material," Proc. SPIE-Int. Soc. Opt. Eng., vol. 1758, pp. 193-204 (1992).

Gafney, H., "A Photochemical Approach to Integrated Optics," J. Macromol. Sci-Chem. vol. A27(9-11), pp. 1187-1202 (1990).

Simmons, K., Stegeman, G., Potter, B., Simmons, J., "Photosensitivity of Solgel-Derived Germanoscilicate Planar Waveguides," Optics Letters, vol. 18, No. 1, pp. 25-27 (1993).

Mendoza, E., Gafney, H., "Photolithography of Integrated Optic Devices in Porous Glasses," Nonlinear Optical Materials, CRC Press, eds. Kuhn, H., Robillard, J., Part V, pp. 178-191 (1992).

Mendoza, E., Gafney, H., "Photolithographic Imaging of Planar Optical Waveguides and Integrated Optic Devices Onto Porous Silicate Glasses and Silica Sol-Gels," Mat. Res. Soc. Symp, Proc., vol. 244, pp. 343-350 (1992).

Mendoza, E., Gafney, H., Morse, David, "Photolithographic Processing Of Integrated Optic Devices In Glasses," SPIE vol. 1583 Integrated Optical Circuits, pp. 43-51 (1991).

Mendoza, E., Gafney, H., Morse, D., "The Photochemical Generation of Gradient Indices in Glass," SPIE vol. 1378 Optically Activated Switching, pp. 139-144 (1990).

Wolkow, E., Gafney, H., Wong, P., Hanson, A., "Highly Resolved Gradient Patterns in Glass by Means of Chemical Vapor Deposition," Mat. Res. Soc. Symp. Proc. vol. 168, pp. 381-393 (1990).

Mendoza, E., Ferrell, D., Lieberman, R., "Photolithography of Bragg Gratings in Sol-Gel Derived Fibers," SPIE vol. 2288 Sol-Gel Optics III, pp. 621-629 (1994).

* cited by examiner

Electro-Optic

Magneto-Optic

Waveguide structure with altered refractive index profile

Waveguide structure with altered periodic refractive index profile

Waveguide structure with tight curvatures using variable refractive index profiles Active waveguide structure with variable refractive index profiles

*FIG. 13*
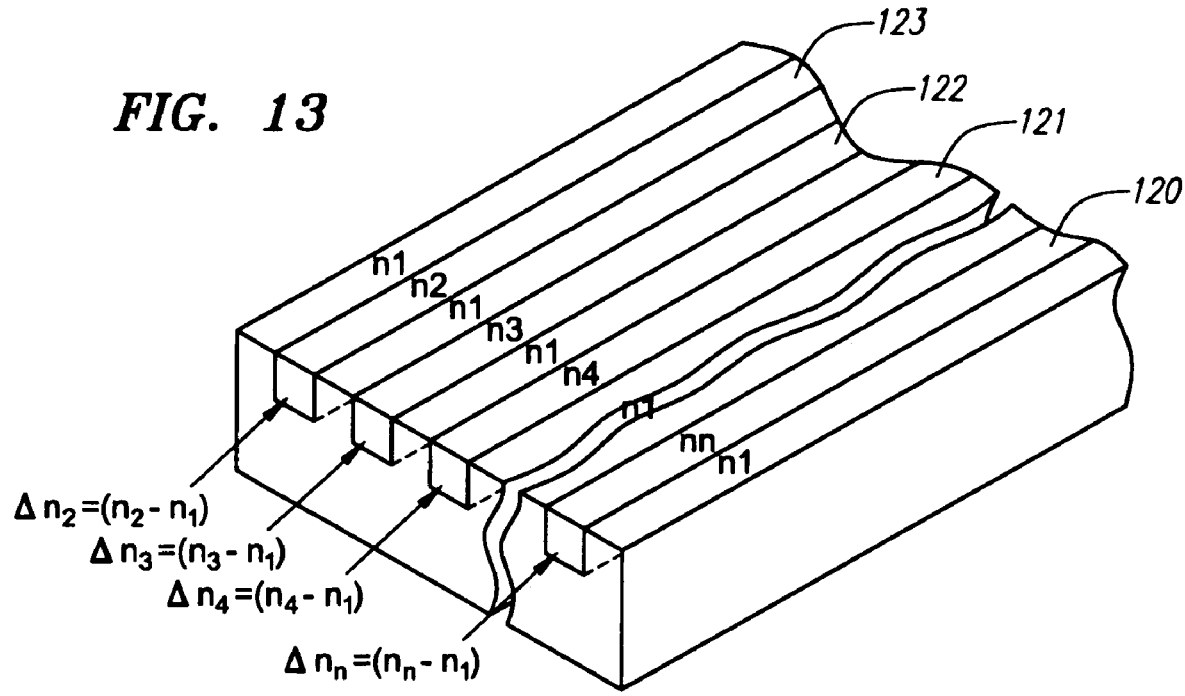
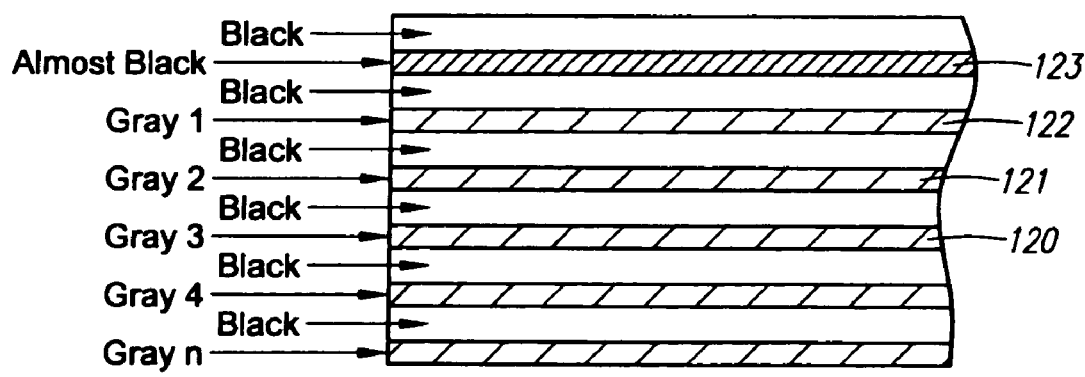
*FIG. 14*

INTEGRATED OPTIC DEVICES AND PHOTOSENSITIVE SOL-GEL PROCESS FOR PRODUCING INTEGRATED OPTIC DEVICES

This application is a continuation of U.S. patent application Ser. No. 09/574,840, filed May 19, 2000 now U.S. Pat. No. 7,016,589, the contents of which are hereby incorporated by reference as if fully set forth herein.

REFERENCE TO RELATED APPLICATIONS

This application is related to a companion application, Ser. No. 09/574,841, filed May 19, 2000.

FIELD OF THE INVENTION

This invention relates to sol-gel derived glass thin films and, more particularly, to a thermally-assisted process for fabricating both passive and active devices therein as well as to the devices so fabricated.

BACKGROUND OF THE INVENTION

The sol-gel process for forming glass is well known in the art. Further, it is well known to fabricate passive devices such as waveguides, splitters and directional couplers, and grating structures as well as thermo-optic switches using photolithographic processes. Canadian Demand Application No. 2,218,273 describes a solvent-assisted lithographic process in use by Lumenon Innovative Lightwave Technologies, Inc. and is incorporated herein by reference.

The above-identified patent describes a process including the sequence of steps for forming a silicon dioxide layer on a silicon substrate, depositing a photosensitive sol-gel layer on the silicon dioxide layer, exposing the sol-gel layer to a pattern of ultra violet light to solidify portions of the sol-gel layer, and (wet) etching to remove the non-solidified portions of the sol-gel layer. The solidified portion of the sol-gel layer, in one embodiment, comprises an elongated ridge for defining a waveguide. A cladding layer is added on top of the ridge resulting in a non-planar surface.

A doctoral thesis entitled: "Photolithography of Integrated Optic Devices in Porous Glasses", City University of New York, 1992 by E. Mendoza, one of the applicants herein, describes techniques for fabricating integrated optic devices in porous glass employing a variety of reactants. The thesis describes sol-gel as a technique for forming bulk porous glass.

BRIEF DESCRIPTION OF THE INVENTION

The present invention is directed at extensions of the bulk techniques described in the above-noted thesis to sol-gel thin films. Specifically, a technique for the photolithographic fabrication of integrated optic structures in thin films of photosensitive sol-gel glasses is described here. This technique involves the formation of a photosensitive sol-gel, including an organometallic photosensitizer, on a suitable substrate (glass, silicon, or any other support material). Next, the photosensitive film is exposed to white or ultraviolet light inducing a photochemical reaction in the photosensitive sol-gel glass network with the end photo-product being a metal oxide. The photodeposited metal oxide is permanently bound to the sol-gel film glass network as a glass modifier during a heat treatment process, which in turn induces a permanent refractive index increase in the glass.

The refractive index increase is dependent on the concentration of the photosensitizer and on the light energy used in the exposure process. Therefore, a spatially varying light intensity during exposure results in a spatially varying refractive index profile. This refractive index profile induced in the film can be designed to guide light.

Exposure of the photosensitive sol-gel film to white or ultraviolet light induces the unbinding of the metal from the photolabile moiety component of the photosensitizer followed by the binding of the metal to the sol-gel film. The exposed regions of the sol-gel film are converted to a metal oxide silica film by first and second step heatings at a low temperature and high temperature, respectively. The low temperature drives out the unexposed (unbound) photosensitizer and the unbound photolabile moiety. The higher temperature step unbinds the organic component from the bound photosensitizer and drives it off. This step also permanently binds the metal to the silica film forming a metal oxide glass modifier. If the sol-gel film is deposited on a glass or silicon substrate, a metal oxide doped silica region of Si—O-M-O—Si is formed in the exposed regions acting as a glass modifier which in turn modifies the refractive index. The unexposed photosensitizer is driven off during the heat treatment steps. Since no material is removed from the sol-gel film in this process, as in the case of prior-art-processes, the resulting top surface is planar, thus leading to a simpler process for producing devices and increase lifetime of resulting devices.

The index of refraction of the light guiding waveguide is determined by the concentration of the metal oxide and by the type of metal oxide ($GeO_2$, $SnO_2$, $PbO_2$, $TiO_2$, among others) photodeposited. Accordingly, a buried waveguide of metal oxide doped silica material of relatively high index of refraction is sandwiched between regions of a dielectric material with relatively lower index of refraction. Therefore, the change in refractive index between the metal oxide doped silica waveguide and the dielectric material is controlled by the concentration of the metal oxide and by the type of metal oxide. If the photodeposited metal oxide doped waveguide exhibits non-linear optical properties (semi-conductive, electro-optic, magneto-optic, and/or all-optical) active optical devices can be realized in this material system. If electrodes are attached adjacent to the waveguide and a voltage applied, for example, an electro-optic switch or an optical modulator may be formed using a varying electrical field for varying the index of refraction of the waveguide. The temporary change in refractive index can be used to switch or modulate the light guided through the waveguide.

The invention thus is based on the realization that the richness in the number and variety of constituents which can be included in a sol-gel film enable unique integrated optic structures to be fabricated, particularly with the use of photo masks, which are not achievable with alternative techniques. Specifically, the technique permits a high degree of control not only in defining high index of refraction channels in a sol-gel film but also in controlling the index of refraction incrementally along the length of the channel and from channel to channel in multichannel devices such as wavelength division multiplexers (WDM). Accordingly, the index can be changed to enable strongly guided waveguides to be fabricated creating low-loss, small bend radii thus permitting a large number of channels to be fabricated in a single film. A two-hundred and fifty-six channel wavelength division multiplexer, for example, can be made in a very small chip because of the tailoring of the indices of refraction channel to channel and along the length of the channel.

Moreover, the ends of the channels can be made with indices of refraction to obtain NA matching to optical fibers.

Further, because the technique produces buried channels (waveguides) and since the buried channels can be made in successive sol-gel glass films, multiple layer devices can be realized, each layer (film) having a plurality of channels.

The high degree of control of the index of refraction along a channel length also permits Bragg gratings to be formed simultaneously with the formation of a channel, thus providing a simple technique for producing, for example, integrated optic lasers. Abundance of compatible constituents such as erbium, for example, also permits amplification of light signals in the channels. Other constituents allow for the formation of electro-optically active waveguides permitting, for example, modulation of light signals in the waveguide.

The technique not only permits the foregoing unique structures to be fabricated but also permits the fabrication of optical couplers, splitters, switches, tunable filters, amplifiers, modulators, combiners, directional couplers, optical add-drops, gratings, both active and passive devices described, for example, in *Optical Fiber Communications 111B*, Academic Press, New York edited by Ivan P. Kaminow and Thomas L. Koch, 1997.

BRIEF DESCRIPTION OF THE DRAWINGS

FIGS. 13 and 14 are schematic projection and top views of a variable index waveguide array used in a wavelength division multiplexer and a gray scale mask for the fabrication thereof, respectively;

DETAILED DESCRIPTION OF ILLUSTRATIVE EMBODIMENTS OF THIS INVENTION

The invention is based on the recognition that a photosensitive sol-gel film including an organometallic photosensitizer can be made into a metal oxide material when exposed to ultra violet or white light in the wavelength range of from about 200 nm to 700 nm followed by a controlled heat treatment. The invention is further based on the realization that the exposure of such a film to that light through a photo mask can be made to produce a waveguide channel of relatively high index of refraction, metal oxide material sandwiched between regions of dielectric, low refractive index material. Furthermore, based on the selection of appropriate precursors, the photodeposited metal oxide doped waveguide exhibits non-linear optic properties (semiconductive, electro-optic, magneto-optic and/or all optic) so that electrodes placed adjacent to the waveguide for creating electric fields in response to applied voltages can induce temporary charges in the refractive index of a waveguide.

Figure 1:
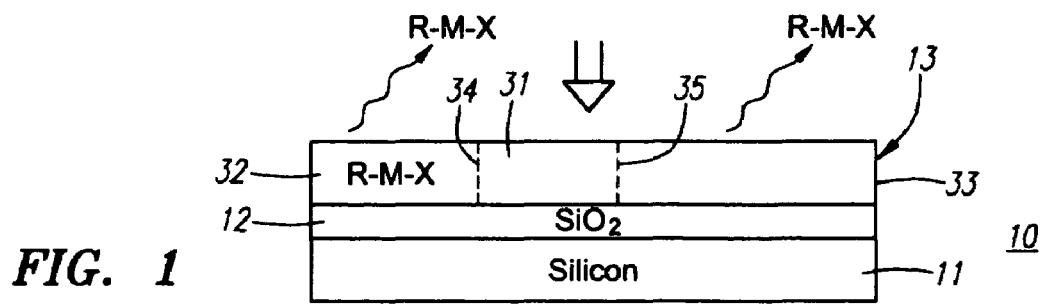
FIGS. 1 and 2 are schematic side views of alternative generic structures in accordance with the principles of this invention.
Figure 2:
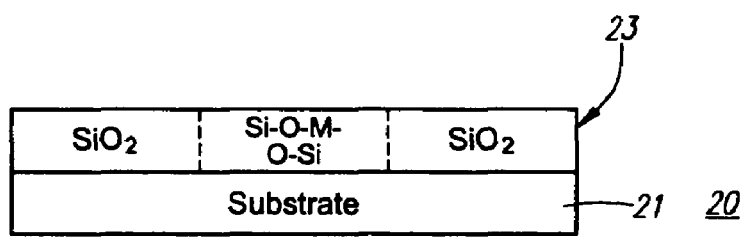

In this context, FIGS. 1 and 2 show schematic side views of a work piece 10 and 20 respectively. In FIG. 1, a silicon substrate 11, 6"×6"×1 mm, is coated with a silicon dioxide (deposited or grown) layer 12 that is 1–2 microns thick. The silicon dioxide layer 12 has a photosensitive sol-gel film 13 formed on it by well-understood techniques such as spinning and/or dip coating.

In FIG. 2, the substrate 21 comprises glass, in which case no silicon dioxide layer is required. A photosensitive sol-gel film 23 is formed directly on the glass substrate.

The sol-gel film is represented, in FIGS. 1 and 2, as having R-M-X chemical constituents in it. These materials are added to the sol-gel by dissolving them in the sol-gel solution. The sol-gel film illustratively has a thickness of about 1–5 microns.

The notation—R—refers to anyone of a group of volatile organic materials including $CH_3$; $CH_3-CH_2$, $CH_3-CH_2-CH_2$ and the like. The notation -M- refers to any one of the metals of group IVB of the periodic table including Ge, Sn and Pb; group VIB including Se and Te; group VIIIA including Fe, Co, Ni; and group IVA including Ti and Zr and rare earth metals such as Er, Eu, Pr and Tm. The concentration of the metal determines the index of refraction of the sol-gel film in conjunction with the energy of the light used in the subsequent exposure steps.

The -X- notation is the photolabile component of R-M-X and represents a halogen which includes chlorine, bromine, iodine and fluorine, but also carbonyls (CO).

The photosensitive sol-gel film, in accordance with the principles of this invention initially includes R-M-X as indicated in FIG. 1.

The photosensitive sol-gel film (13 or 23) is exposed to white or ultra violet radiation through a mask to define, illustratively, three regions. The regions are identified in FIG. 1 as exposed region 31 with unexposed regions 32 and 33 defining interfaces 34 and 35 with region 31 respectively. FIG. 1 also can be seen to include a silicon substrate 11 and a silicon dioxide surface layer 12.

Figure 3:
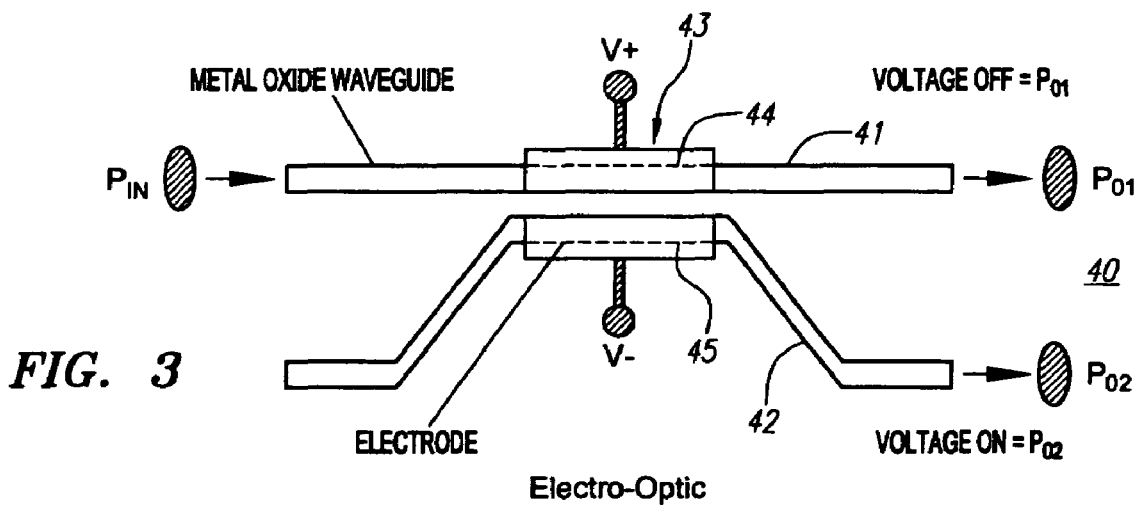
FIGS. 3, 4 and 5 are schematic side views of electro-optic, magnetic-optic and optical switches, respectively, in accordance with the principles of this invention.

FIG. 3 is a top view of an electro-optic switch 40 including first and second waveguiding channels 41 and 42 fabricated as described in connection with FIGS. 1 and 2. The channels are in close proximity to one another at region 43. Electrodes 44 and 45 are formed over channel 41 and channel 42, respectively, at region 43. A voltage, indicated by the V+ and V− signs, produces a localized change in the index of refraction that causes a signal, Pin, in channel 41 to exit channel 42 (Po2). In the absence of such a voltage, the signal (Pin) exits channel 41 (Po1). Thus, a high-speed electro-optic switch is realized.

Alternatively, electrodes 44 and 45 may be formed directly in the sol-gel film by using a photosensitizer that leads to the deposition of a high conductivity material when exposed to light. To this end, a photosensitized thin film is exposed through a mask to form the electrodes and then heat treated to remove the photosensitizer but at a temperature which avoids consolidating the film. Next a second photosensitizer is introduced into the film, exposed through a mask to form the waveguide and the heat treatment to remove the photosensitizer and consolidate the film is carried out.

Figure 4:
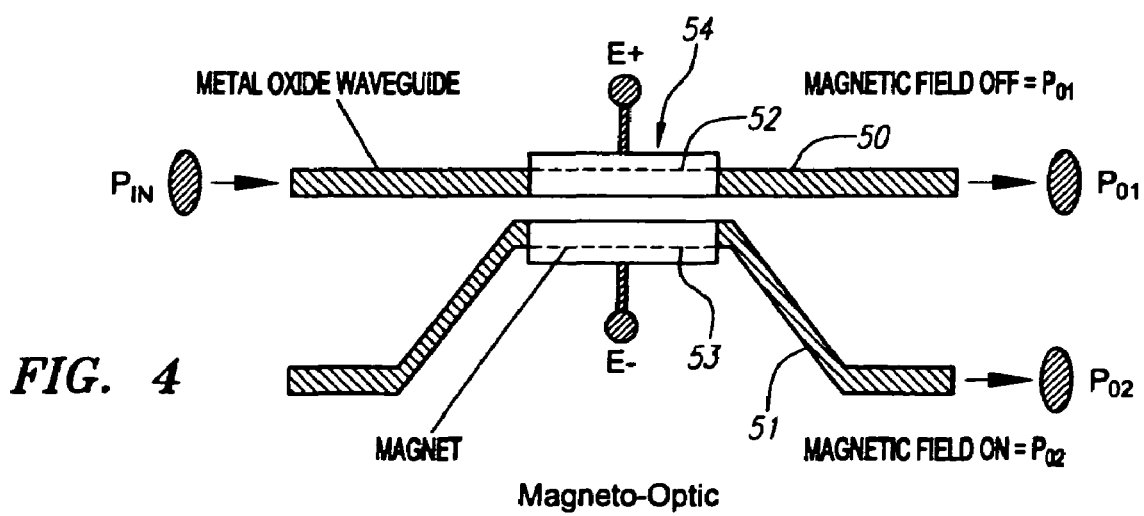

FIG. 4 shows a magneto-optic switch fabricated as discussed in connection with FIGS. 1 and 2 using an M constituent which confers magnetic properties to channels 50 and 51 in FIG. 4. Magnets 52 and 53 are positioned at region 54 at which the channels come into close proximity. In the presence of a magnetic field, an input signal Pin in channel 50 exits channel 51 (Po2). In the absence of a magnetic field, the signal exits channel 50 (Po1).

Figure 5:
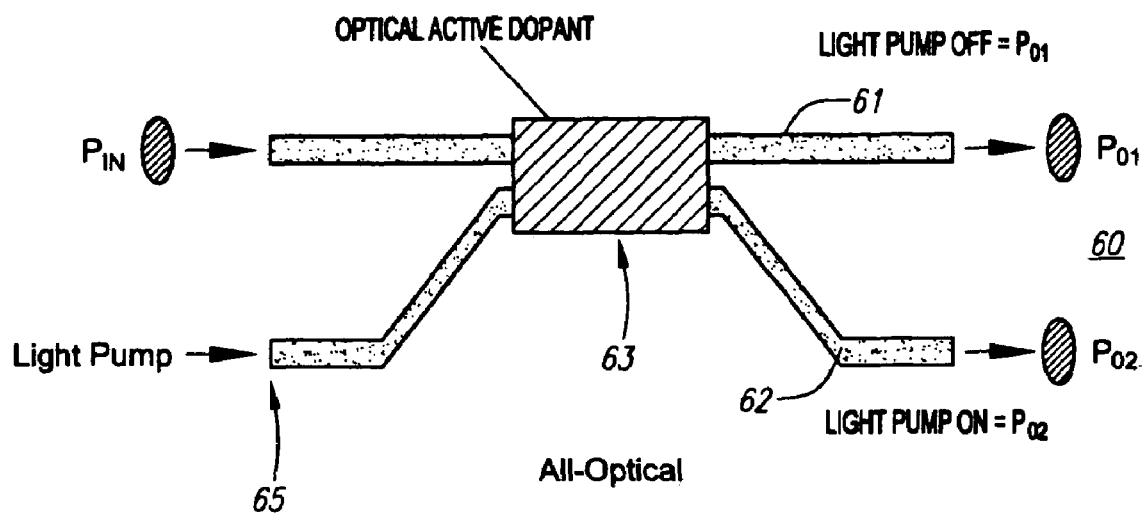

FIG. 5 shows an all optical switch 60 with channels 61 and 62. The channels are in close proximity at region 63. Region 63 includes an optically active dopant. If pump light is introduced at the input 65 of channel 62, a signal Pin at the input of channel 61 exits channel 62 (Po2). In the absence of pump light, the signal exits channel 61 (Po1).

FIGS. 3, 4, 5, 6 and 7 are illustrative of electronic, magnetic or optic field control which permit entire categories of devices to be fabricated. These include modulators, directional couplers, tunable gratings and total internal reflection deflectors among others.

The inclusion of materials such as tin oxide, lead oxide, titanium oxide, and zirconium oxide, thulium oxide allows for the fabrication of electro-optic switches. The inclusion of materials such as iron, iron oxide, nickel and nickel oxide allows the fabrication of magneto-optic switches. The inclusion of rare earth materials such as erbium oxide, neodymium oxide, ytterbium oxide and praseodymium oxide allows the fabrication of all optical switches.

The operating principle of the electro-optic switch is based on the use of a metal oxide waveguide with electro-optic properties. The variation of an electric field to many electro-optic materials leads directly to a variation in the real and imaginary components of the refractive index. This effect can be used for switching in an integrated optic device, based on a waveguide proximity coupler structure as shown in FIG. 3. In this design, when the voltage is off the light beam Pin travels directly through the waveguide with output Po1, when the field is on, the induced refractive index change causes the light beam to couple into the adjacent waveguide with output Po2. Turning the voltage off causes the light to return to its original state with output Po1.

A similar effect occurs in the case of the magneto-optic switch. In this case a waveguide with magneto-optic properties is used, such that the variation of a magnetic field in the vicinity of the magnetic waveguide leads directly to a variation in the real and imaginary components of the refractive index. Hence, by applying a magnetic field to the structure, the light output in FIG. 4 can be switched between the two waveguide arms (Po1 and Po2) of the structure.

Similarly, the operating principle of the all-optical switch is based on the use of a dopant material on the active part of the integrated optic structure, the refractive index of which (real and imaginary components) is modified when excited by an external laser source (light pump) as shown in FIG. 5. In this design, when the light pump is off the light beam Pin travels directly through the waveguide with output Po1. When the light pump is turned on, the induced refractive index change causes the light beam to couple into the adjacent waveguide with output Po2. With the pump off, the light returns to its original state with output Po1.

Figure 6:
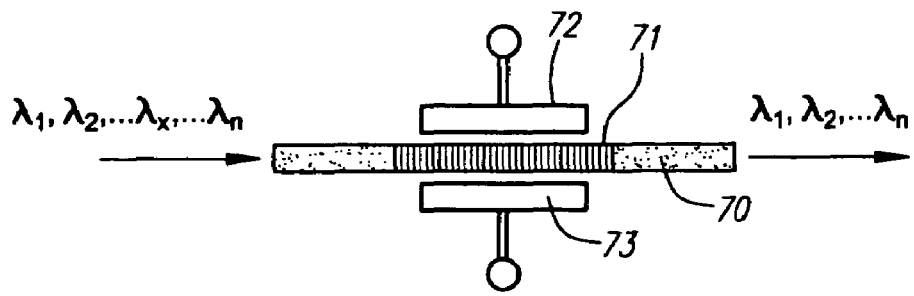
FIGS. 6 and 7 are schematic side views of a tunable Bragg grating and a tunable add/drop filter in accordance with the principles of this invention.

FIG. 6 illustrates a tunable Bragg grating filter operable to reflect a selected wavelength. The figure shows a channel 70 fabricated as discussed in connection with FIGS. 1 and 2. The Bragg grating is indicated at 71 and electrodes 72 and 73 are located to produce an electric field to change the index of refraction of the channel at the grating. In the presence of the field, an input signal with wavelengths $\lambda 1$, $\lambda 2 - - - \lambda x - - - \lambda n$ enters the channel with $\lambda 1, \lambda 2 - - - \lambda n$ exiting the channel and wavelength $\lambda x$ reflected as indicated.

Figure 7:
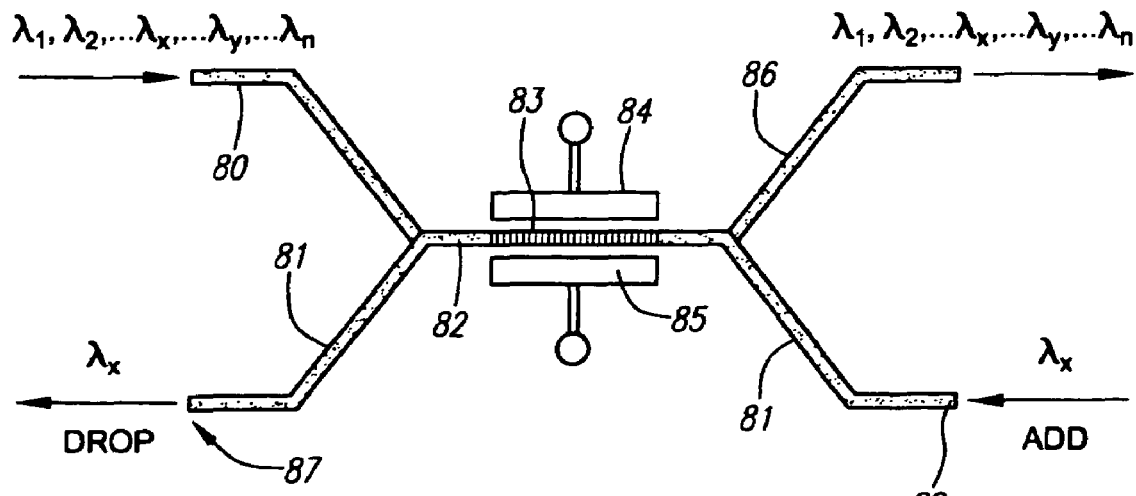

FIG. 7 illustrates a tunable add/drop filter fabricated as described in connection with FIGS. 1 and 2. The filter includes channels 80 and 81 with a common section 82 which includes a Bragg grating 83. Electrodes 84 and 85 are positioned to generate an electric field which changes the index of refraction in section 82. An electrical field applied to the electrodes tunes the Bragg wavelength to the value $\lambda x$ depending on the magnitude of the electrical field so that wavelength $\lambda x$ exits channel 81 at 87 and may be added at 88.

The devices of FIGS. 3 through 7 are produced by exposing a photosensitive sol-gel film to visible or ultra violet light. The light is operative to unbind the photolabile (X) component from the photosensitizer and to bind the metal (M) permanently in the exposed region. The light, illustratively, is ultra violet in a wavelength range of about 200 nm–400 nm and visible in the wavelength range of 400 nm to 700 nm and exposure is for 5 minutes to 48 hours duration depending on light intensity.

The light exposure is followed by a sequence of first and second heating steps. The first heating step is at a temperature of about 300° C. for a period of 1 hour and results in the driving off of the unexposed sensitizer from the entire sol-gel layer and the unbound photolabile moiety (X) from the exposed regions of the sol-gel layer. The second heating step is at about 900° C. for about 1 hour duration and results in the unbinding of the R component and the driving off of that component from the entire sol-gel film. A subsequent heating step at about 1050° C. can consolidate the pores in the sol-gel film yielding a solid, non-porous glass. The resulting structure, as shown for example in FIG. 3, includes channels 41 and 42 comprising Si—O-M-O—Si materials and regions outside the channels comprising $SiO_2$. The channels are a metal oxide doped silica region in the embodiment of FIG. 4; the regions outside the channels are electrically insulating.

The metal oxide induced by the binding of the component (M) in region 31 (of FIG. 1) defines the index of refraction in the channels. Accordingly, the concentration of metal oxide can be selected so that the index of refraction in the channels relates to the indices of refraction in regions outside the channels to define a waveguide for light. A voltage signal impressed between electrodes as indicated in FIG. 3, permits further control of the index of refraction in the channels and thus to the deflection of the signals passed through the waveguide.

Figure 8:
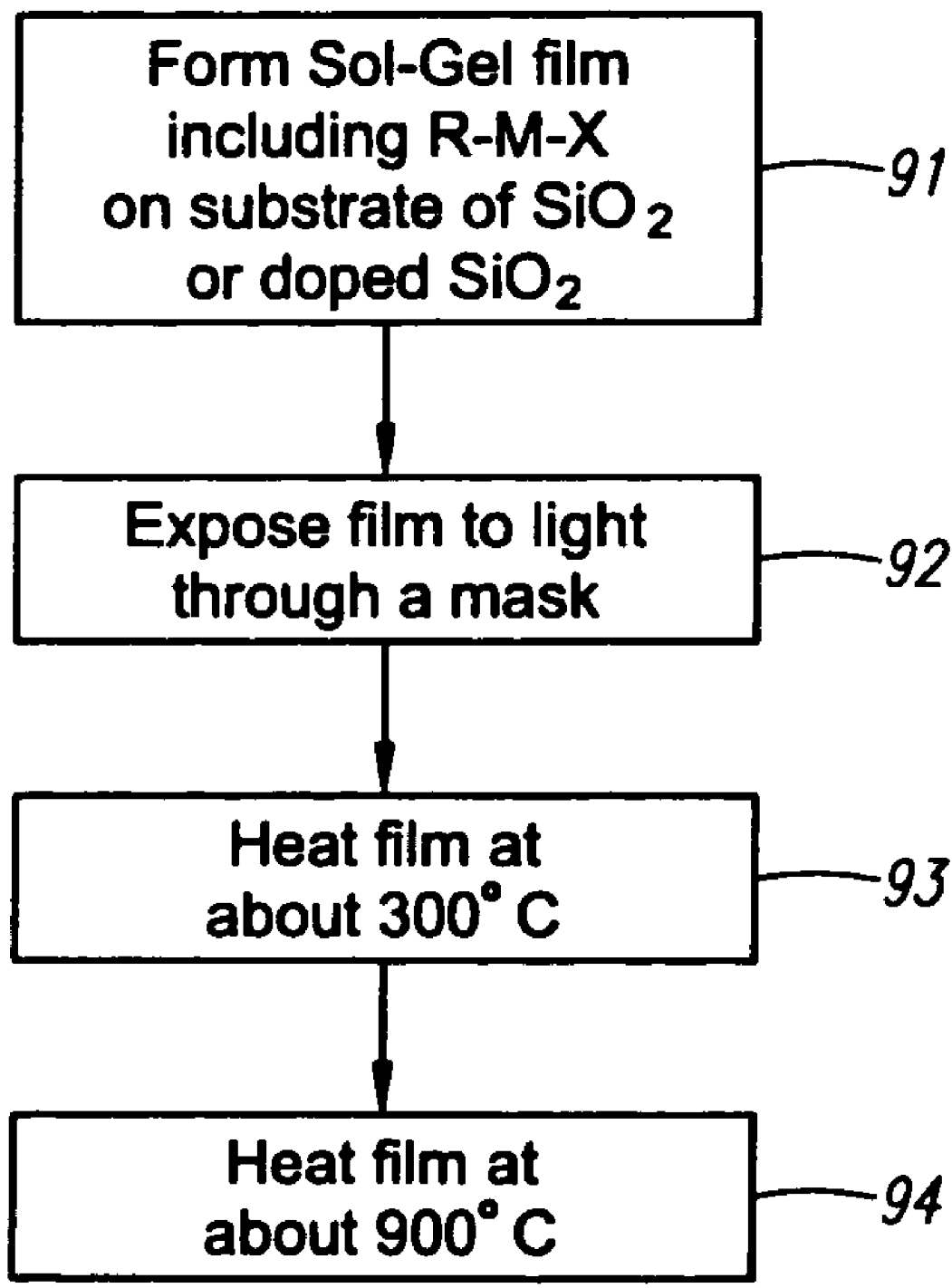
FIG. 8 is a block diagram of the method for fabricating the structure of FIGS. 1 and 2.

FIG. 8 is a flow diagram of the method for fabricating the device of FIGS. 1 and 2. Specifically, block 91 indicates the formation of a photosensitive sol-gel film on a suitable substrate such as silica glass or silicon containing a thermally grown silica layer. Block 92 indicates the exposure of at least one channel of the sol-gel layer to (visible or) ultra violet light. Block 93 represents the first heating step of about 300° C. to evaporate the unexposed photosensitizer (R-M-X) and the unbound photolabile moiety (X). Block 94 represents a second heating step at about 900° C. to unbind and evaporate the organic material (R) from the layer.

The photosensitive sol-gel process permits the precise control of refractive index to produce a variable refractive index distribution along the horizontal plane of the film. To obtain variable refractive index gradient waveguide channels, the photosensitive sol-gel film (13 of FIG. 1) is exposed using a photo mask. Exposure to UV or visible light through the mask induces a photochemical reaction of the photosensitizer immobilized in the sol-gel matrix. A percentage of photosensitizer transforms to a metal oxide depending on the degree of light exposure (controlled by the photo mask). The metal oxide acts as a refractive index modifier of the silica film. Thus, the use of a gray scale photo mask allows the concentration of metal oxide, or refractive index profile, along the light propagation path of the waveguide (channel) to be controlled.

Figure 9:
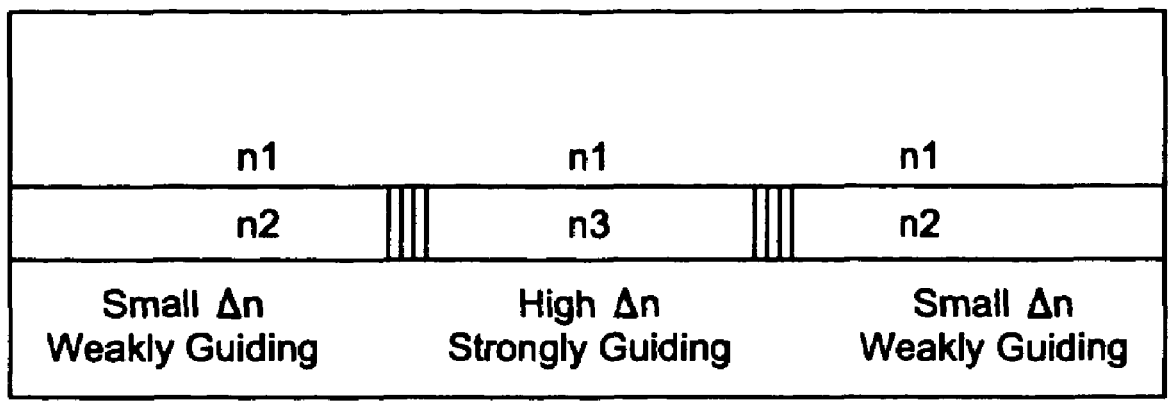
FIGS. 9, 10, 11 and 12 are schematic top views of alternative waveguide structures in accordance with the principles of this invention.
Figure 10:
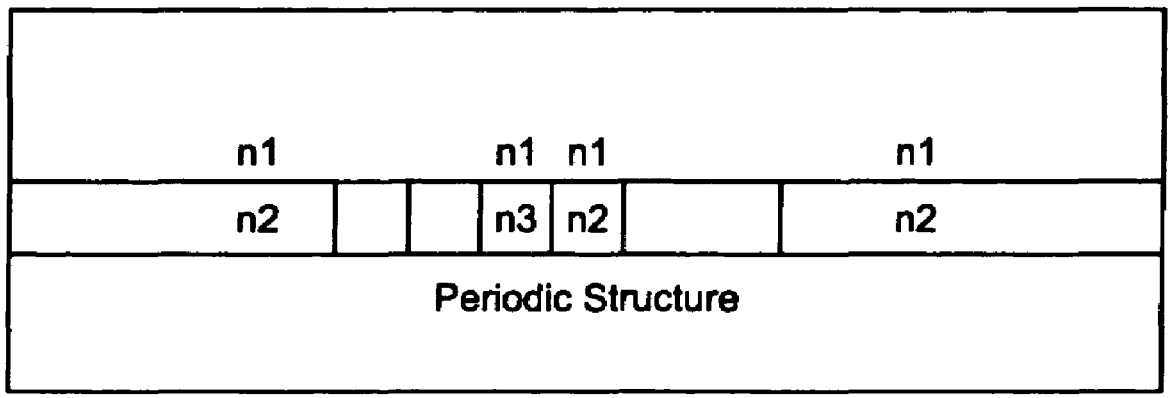
Figure 11:
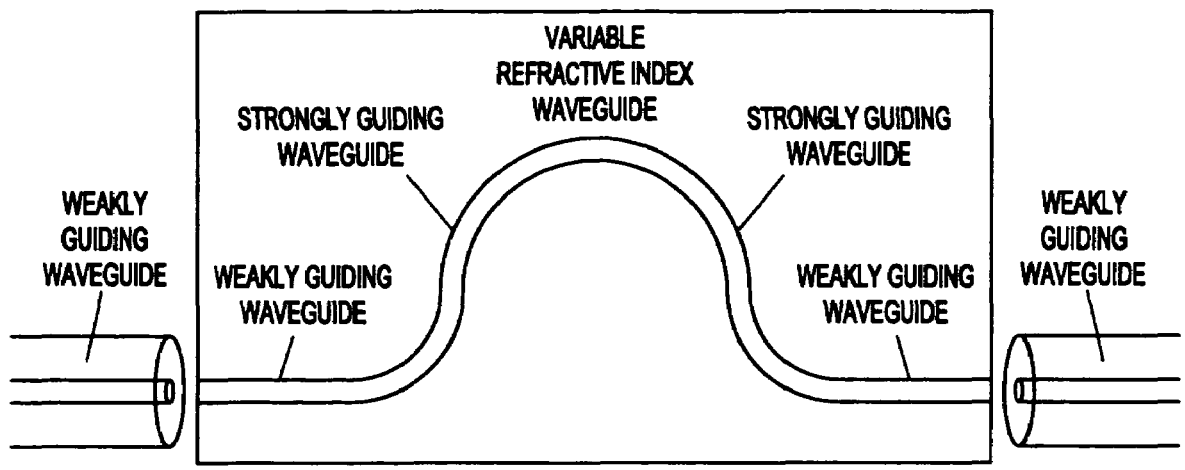
Figure 12:
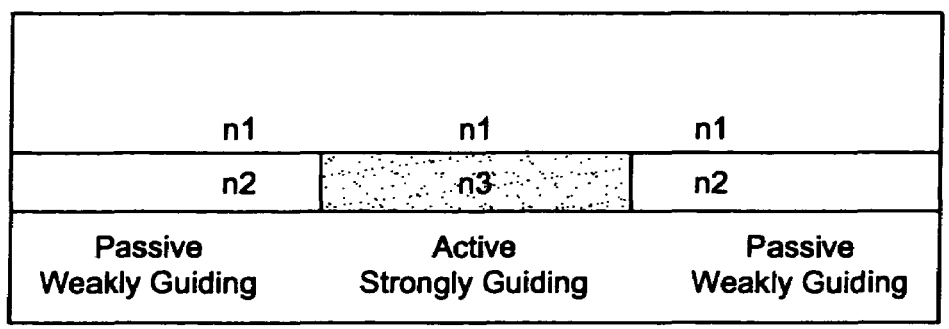

The ability to precisely control the refractive index of the waveguide during the light exposure process allows the fabrication of structures with complex index profiles. These include the ability to fabricate waveguides such as the one shown in FIG. 9 with altered index profiles. In this waveguide design it is possible to combine regions of small refractive index change forming weakly guiding waveguides with numerical apertures matched to that of telecommunication fibers, with regions of high refractive change forming strongly guiding waveguides, and back to regions of small refractive index change forming weakly guiding waveguides. This variation in index can be graded adiabatically to eliminate the reflections associated with abrupt changes in index of refraction. The combination of these waveguide structures allows the coupling of fibers to the waveguide as well as to have the creation of regions with special properties, i.e. passive waveguides with variable refractive indexes such as gratings (FIG. 10), or tight bends such as those used in phase array grating designs (FIG. 11), or active waveguides with regions that exhibit electro-optic or magneto-optic activity (FIG. 12).

FIG. 13 is a schematic representation of an integrated optic chip waveguide array illustratively including four channels 120, 121, 122, and 123. The difference between the refractive index of the core ($n_z$) and the refractive index of the cladding ($n_1$) is expressed as $\Delta n$. Thus, the $\Delta n$ for channel 120 is $n_n-n_1$, the $\Delta n$ for channel 121 is $n_4-n_1$, the $\Delta n$ for channel 122 is $n_3-n_1$, and the $\Delta n$ for channel 123 is $n_2-n_1$.

The fabrication of the structure of FIG. 13 is as described hereinbefore except that a photo mask is used as shown in FIG. 14. As can be seen in the figure, the mask for channel 123 is almost black; the mask for channel 122 is dark gray, the mask for channel 121 is a lighter gray and even lighter for channel 120, Additional channels would require lighter and lighter masks as indicated in the figure, the range going from almost totally black to clear. The regions between the channels (the cladding) require a black portion of the mask. The use of the photo mask allows all the channels to be defined simultaneously.

The effect of variable refractive index is based on the photochemistry of the photosensitive sol-gel film where for each photon of light a photosensitive molecule is transformed into a metal-oxide. Each of the metal oxide particles induces a refractive index change in the glass. The larger the number of metal oxide particles photo-produced, the larger the refractive index change. Consequently, by using a photo mask, we can produce a variable index integrated optic chip because the darker regions of the mask allow fewer photons to expose the chip than the lighter regions of the mask.

This same procedure can be used in the fabrication of an array of curved waveguides with variable refractive indices. By controlling the refractive index of the curved waveguides (channels) during the light exposure process, we can produce curved waveguides with smaller and smaller bending radii. Since the bending radius is directly related to the refractive index change of the waveguide, the larger $\Delta n$ (FIG. 13), the smaller the bending radius.

Figure 15:
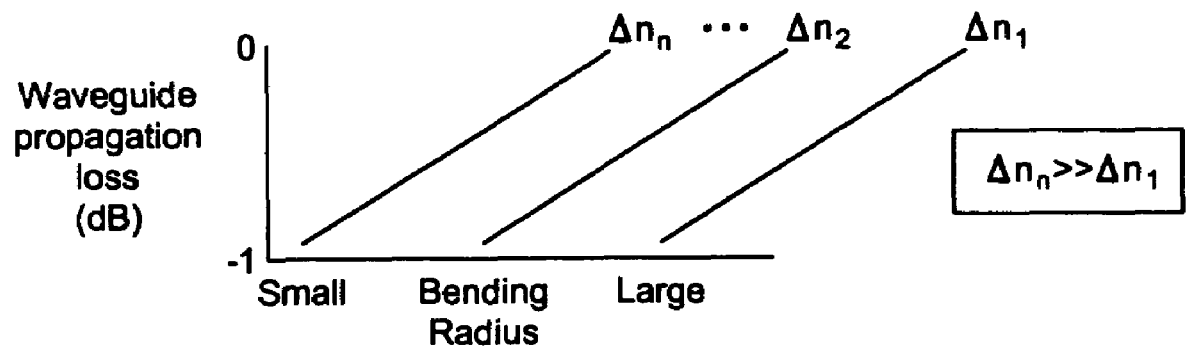
FIG. 15 is a graph of waveguide propagation loss versus channel bend.
Figure 16:
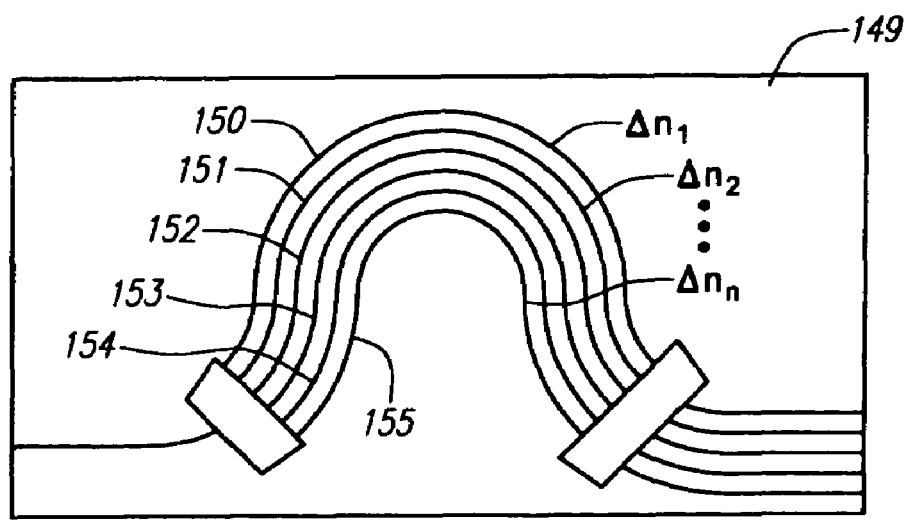
FIG. 16 is a schematic illustration of an array of curved waveguides with variable refractive indices for use in the fabrication of array waveguide grating structures for WDM applications.

FIG. 15 is a graph of waveguide propagation loss (db) versus bend. It is clear from the figure that the losses for the small bend ($\Delta n_n$) is the same for the losses for the large bend ($\Delta n_1$). This property allows for the fabrication of dense (highly packed) curved waveguide arrays because very small bending radii can be achieved. FIG. 16 shows schematically an array of curved waveguides 150, 151, 152, 153, 154, and 155 with variable indices with radii of curvature becoming increasingly smaller from channel 150 to channel 155.

The simultaneous control of refractive index differential is particularly useful in the fabrication of dense and ultra-dense, variable-index, phase-array-waveguide gratings commonly used for fabricating integrated optic WDMs; the WDM structure typically requires curved waveguides in the array. Thus, the use of a gray scale mask and the resulting ability to achieve a variable and/or controlled refractive index in such an array allows the fabrication of highly packed chips in a relatively small package.

Figure 17:
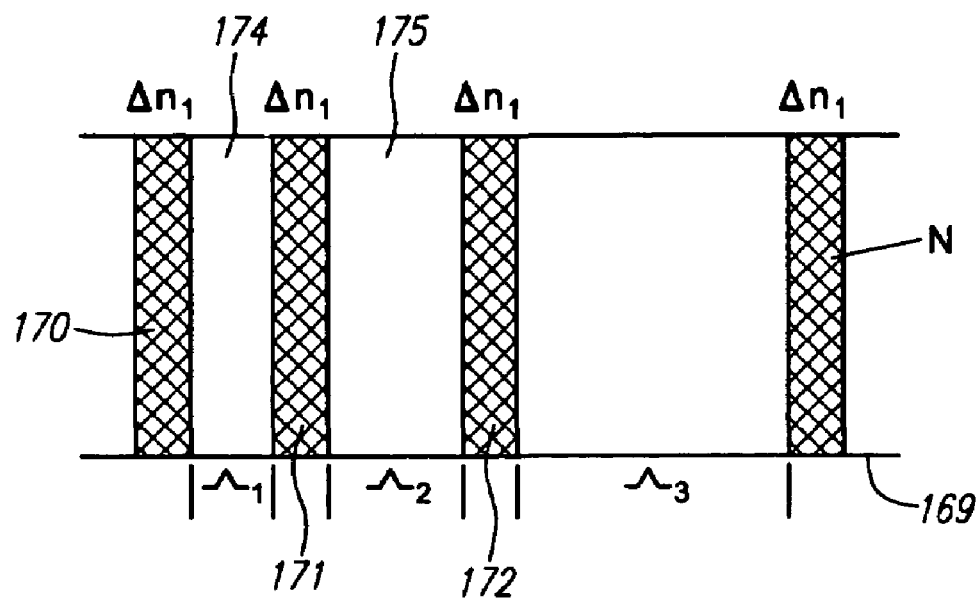
FIG. 17 is a schematic representation of a prior art "Chirped" Bragg grating.

This property also is useful for producing chirped Bragg gratings useful for dispersion compensation in telecommunication systems. FIG. 17 illustrates such a prior art device. FIG. 17 shows a channel 169 with stripes 170, 171, 172 - - - N where the refractive index difference $\Delta n$ is constant and the spacing between stripes (e.g. 174, 175) is different.

Figure 18:
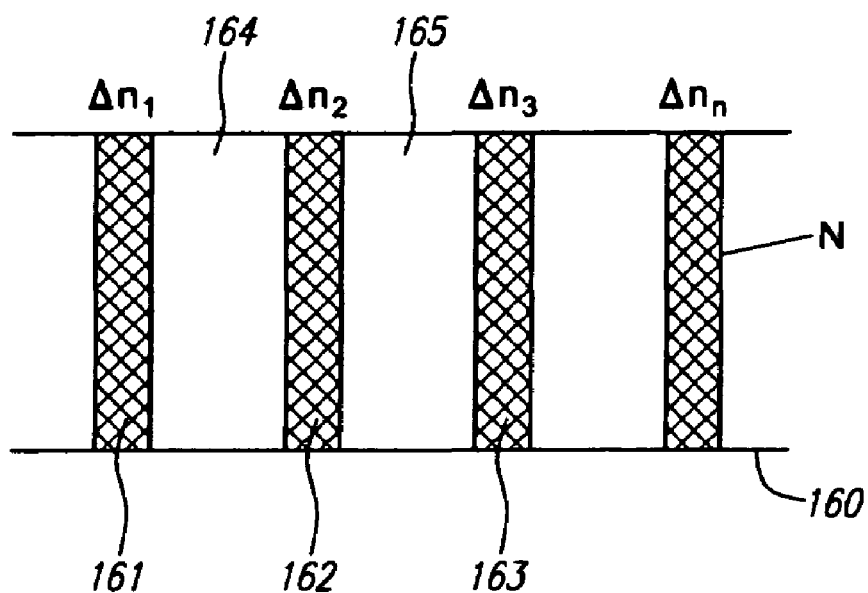
FIG. 18 is a schematic representation of a "Chirped" Bragg grating structure in accordance with the principles of this invention.

In accordance with the principles of this invention, a chirped Bragg grating structure is characterized by a refractive index change and the spacing between stripes is constant. FIG. 18 shows a chirped Bragg grating structure formed in a photosensitive sol-gel film with stripes 161, 162, 163 - - - N where the spacings 164, 165, - - - are constant but the change in index of refraction $\Delta n$ varies from $\Delta n_1$ to $\Delta n_2$ and - - - $\Delta n_n$ along the length of the grating. The use of a photo mask permits easy control over the index of refraction difference particularly in grating structures where the periodicity is typically sub-micron.

Figure 19:
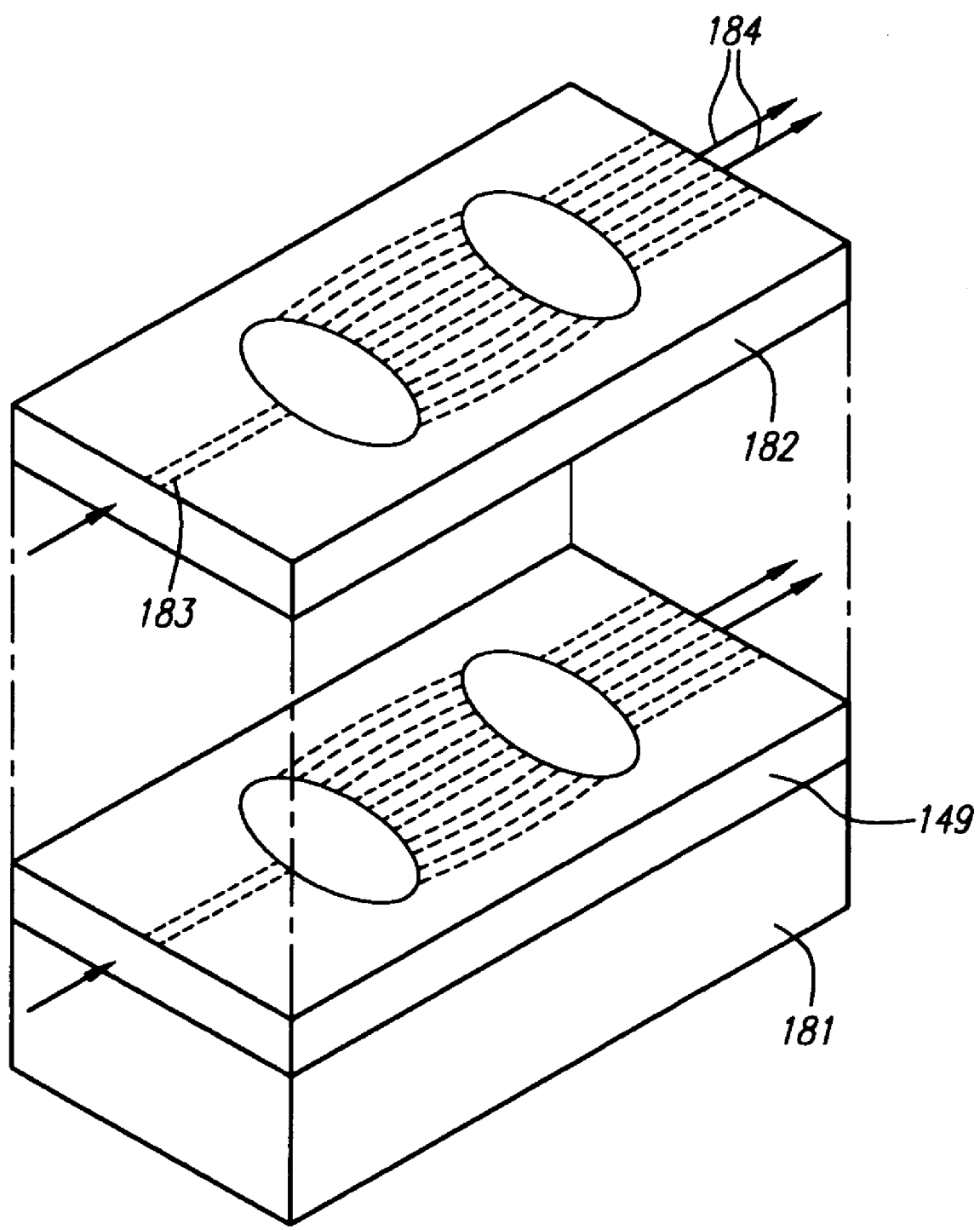
FIG. 19 is a schematic representation of a multilayer device each layer of which includes an array of curved waveguides such as those shown in FIG. 16.

FIG. 19 shows film 149 of FIG. 16 formed on a substrate 181 which may comprise glass or silicon with an $SiO_2$ surface layer as discussed hereinbefore. The sequence of heating steps causes a shrinkage in the thickness (vertical dimension) of film 149. But the film otherwise provides a suitable planar substrate for the formation of additional films in each one of which may be formed a multichannel device (as for example) shown for film 149.

FIG. 19 shows one such additional film 182 extending between an input 183 of multichannel light (typically via an optical fiber not shown) and an output indicated by arrows 184.

Figure 20:
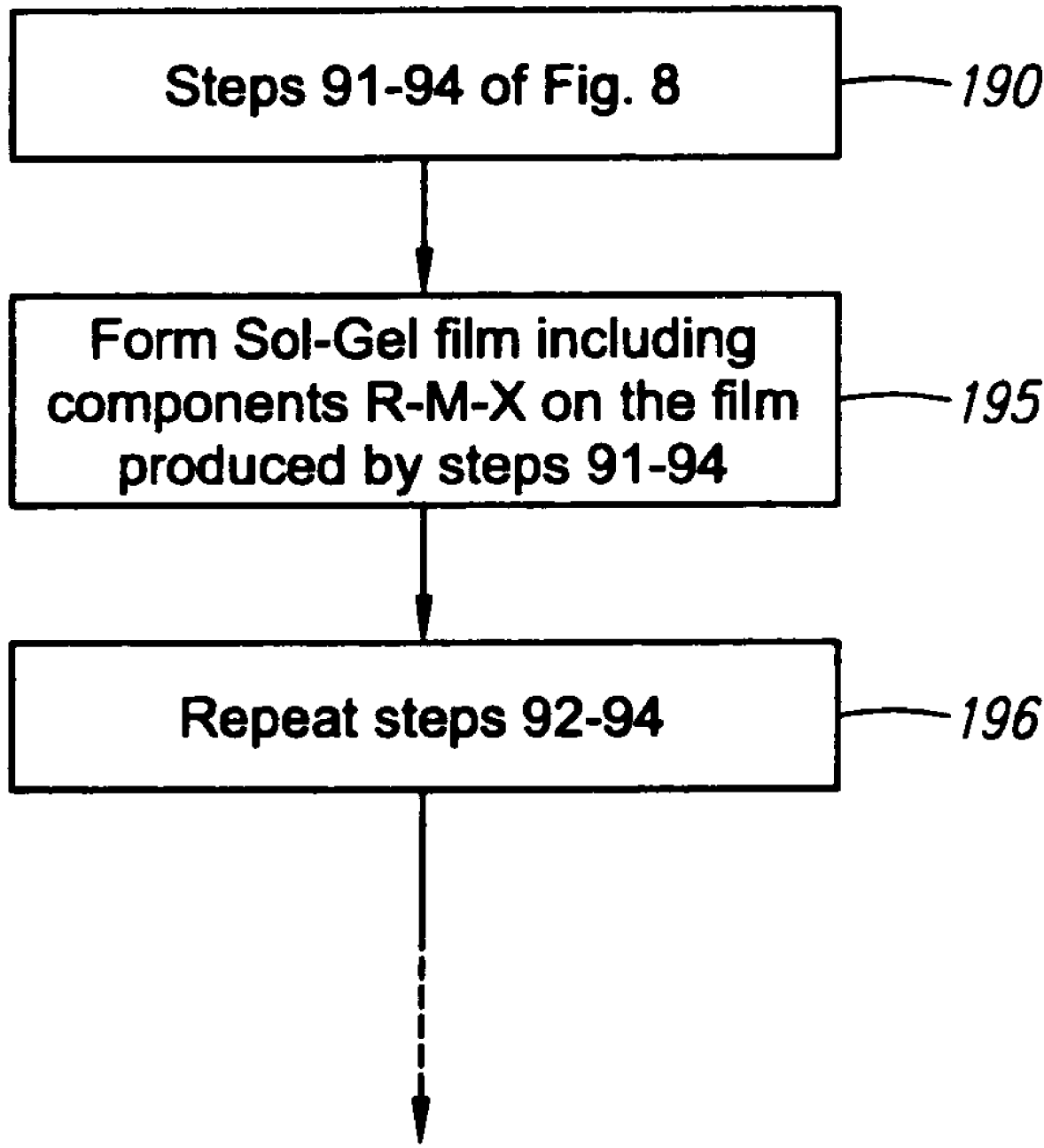
FIG. 20 is a block diagram of the method for fabricating the multilayered structure of FIG. 19.

A multilayered device of the type shown in FIG. 19 is fabricated by the method described in connection with the flow diagram of FIG. 20. The flow diagram indicates the steps 91–94 of FIG. 8 are carried out to produce film 149 of FIG. 19 as indicated by block 190. Thereafter, the film produced by steps 91–94 is used as a substrate for a second film (182) as indicated by block 195 of FIG. 20. The sequence of steps is repeated for each film required as indicated by block 196.

A multilayered device as shown in FIG. 19 is relatively easy to fabricate because of the variety of materials available, the use of a gray scale mask, and the fact that buried (waveguides) channels are produced and the fact that films having thickness (greater than one micron) suitable for integrated optics devices do not shrink laterally.

What is claimed is:

1. A method for forming a high refractive index metal oxide waveguide channel in a sol-gel derived glass, said method comprising the steps of forming a photosensitive sol-gel film including an organometallic photosensitizer on a silica substrate said method comprising the steps of exposing said film through a mask to light of a wavelength and for a time for unbinding different amounts of metal constituents and of said sensitizer in different sections along at least a first channel thereof, exposing said film to heat at a first temperature and for a time to drive off the unbound sensitizer and to bind the metal constituents of said sol-gel film, and exposing said layer to heat at a second temperature higher than said first temperature for a time to unbind and drive off the organic constituents of said sol-gel film.

2. A method as in claim 1 wherein the step of exposing said layer to ultraviolet light is carried out through a photo mask for confining said light to a first channel of said film, and for defining second and third unexposed regions to first and second sides of said channel, said unexposed regions defining first and second interfaces with said first channel respectively.

3. A method as in claim 2 wherein said step of exposing said layer to ultra violet light through a photo mask defines a plurality of spaced-apart first channels, each of said first regions having first and second interfaces with second and third unexposed regions respectively, said channels having differently varying indices of refraction there along.

* * * * *